(12) United States Patent
Vaughn et al.

(10) Patent No.: US 10,605,314 B2
(45) Date of Patent: Mar. 31, 2020

(54) TRANSMISSION FOR WHEELED MACHINE

(71) Applicant: Honda Motor Co., Ltd., Tokyo (JP)

(72) Inventors: Christopher W. Vaughn, Mebane, NC (US); Nathaniel Lenfert, Graham, NC (US)

(73) Assignee: Honda Motor Co., Ltd., Tokyo (JP)

( * ) Notice: Subject to any disclaimer, the term of this patent is extended or adjusted under 35 U.S.C. 154(b) by 174 days.

(21) Appl. No.: 15/941,264

(22) Filed: Mar. 30, 2018

(65) Prior Publication Data

US 2019/0301544 A1    Oct. 3, 2019

(51) Int. Cl.
| | | |
|---|---|---|
| *F16D 41/22* | (2006.01) | |
| *F16H 1/04* | (2006.01) | |
| *F16H 1/06* | (2006.01) | |
| *A01D 34/69* | (2006.01) | |
| *A01D 34/68* | (2006.01) | |
| *A01D 101/00* | (2006.01) | |

(52) U.S. Cl.
CPC ............. *F16D 41/22* (2013.01); *A01D 34/69* (2013.01); *F16H 1/06* (2013.01); *A01D 2034/6837* (2013.01); *A01D 2034/6843* (2013.01); *A01D 2101/00* (2013.01)

(58) Field of Classification Search
CPC .......... F16D 41/185; F16D 41/22; F16H 1/06; A01D 34/69; A01D 2034/6837; A01D 2034/6843; A01D 2101/00
See application file for complete search history.

(56) References Cited

U.S. PATENT DOCUMENTS

| 479,192 | A | * | 7/1892 | Leedle | ................... F16D 41/12 |
|---|---|---|---|---|---|
| | | | | | 192/46 |
| 2,597,735 | A | | 5/1952 | Jepson | |
| 2,800,987 | A | | 7/1957 | Potts | |
| 3,720,294 | A | | 3/1973 | Plamper | |
| 3,732,673 | A | | 5/1973 | Winn, Jr. | |
| 4,117,651 | A | | 10/1978 | Martin, Jr. | |
| 4,214,641 | A | | 7/1980 | Hauser | |
| 4,909,365 | A | | 3/1990 | Tillotson et al. | |
| 4,995,227 | A | | 2/1991 | Foster | |
| 5,303,534 | A | | 4/1994 | Gray | |
| 6,186,916 | B1 | | 2/2001 | Blanchard | |
| 6,475,109 | B2 | | 11/2002 | Blanchard | |
| 6,575,280 | B2 | | 6/2003 | Ballew et al. | |
| 6,702,059 | B2 | | 3/2004 | Blanchard | |

(Continued)

*Primary Examiner* — Adam D Rogers
(74) *Attorney, Agent, or Firm* — Mark E. Duell; Rankin, Hill & Clark LLP

(57) ABSTRACT

A transmission includes an output shaft, a first gear rotatably mounted on the output shaft, a shuttle movably axially on the output shaft, and an engagement member fixedly mounted on the output shaft. The first gear includes first dog teeth. The shuttle includes second dog teeth which engage the first dog teeth. In a drive condition, the engagement member axially moves the shuttle into engagement with the first gear, first surfaces of the first and second dog teeth engage, and, as a result, the first gear rotates in together with the output shaft. In a freewheeling condition the output shaft is stationary, an overdrive of the first gear results in engagement of second surfaces of the first and second dog teeth, and, as a result, the shuttle moves out of engagement with the first gear allowing for free rotation of the first gear about the output shaft.

20 Claims, 9 Drawing Sheets

(56) References Cited

U.S. PATENT DOCUMENTS

| | | | |
|---|---|---|---|
| 6,742,409 B2 | 6/2004 | Blanchard | |
| 6,755,759 B2 | 6/2004 | Blanchard | |
| 6,761,087 B2 | 7/2004 | Blanchard | |
| 6,789,441 B2 | 9/2004 | Blanchard | |
| 6,863,166 B2 | 3/2005 | Blanchard | |
| 7,004,298 B2 | 2/2006 | Blanchard | |
| 7,175,012 B2* | 2/2007 | Ruebusch | A01D 34/69 192/48.8 |
| 7,413,067 B2* | 8/2008 | Tsukada | F16D 3/02 192/108 |
| 7,555,968 B2 | 7/2009 | Blanchard | |
| 7,641,580 B2 | 1/2010 | Blanchard | |
| 7,665,589 B2 | 2/2010 | Blanchard | |
| 7,669,702 B2 | 3/2010 | Blanchard | |
| 8,109,175 B2 | 2/2012 | Blanchard | |
| 8,197,368 B2 | 6/2012 | Blanchard | |
| 8,210,324 B2 | 7/2012 | Blanchard | |
| 8,393,985 B2 | 3/2013 | Blanchard | |
| 8,485,065 B2 | 7/2013 | Blanchard | |
| 8,656,799 B2 | 2/2014 | Blanchard | |
| 8,671,790 B2 | 3/2014 | Blanchard | |
| 8,671,791 B2 | 3/2014 | Blanchard | |
| 8,851,256 B2 | 10/2014 | Blanchard | |
| 9,223,269 B2* | 12/2015 | Suzuki | G03G 15/757 |
| 10,428,941 B2* | 10/2019 | Thompson | F16H 63/32 |
| 2017/0268584 A1 | 9/2017 | Heath et al. | |
| 2018/0073599 A1* | 3/2018 | Yoshimura | F16D 23/02 |
| 2019/0242442 A1* | 8/2019 | Shiotsu | F16D 23/08 |
| 2019/0301543 A1* | 10/2019 | Vaughn | F16D 41/06 |

* cited by examiner

TRANSMISSION FOR WHEELED MACHINE

BACKGROUND

Currently, the drive system of a wheeled machine, for example a lawnmower, includes a transmission and wheels driven by a drive gear or pinion on the output shaft of the transmission. In order to minimize friction when the user pushes the lawnmower forward, simple ratchet mechanisms have been used inside the pinion mounted on the transmission output shaft. This allows for one-way driving of the wheels by the transmission and low friction in the forward direction. However, if the user wants to pull the lawnmower backwards, the ratchets do not disengage from the transmission output shaft. This causes high roll-back friction that the user must overcome to move the lawnmower backwards. In many cases, the pullback load is high enough to cause customers to complain about high load.

It is known to use a combination of mechanisms to allow freewheeling when the transmission is not driving the system, and many of these designs are contained within the transmission itself. The internal-to-transmission style solves the freewheeling problem by disengaging the output shafts from the input shaft of the transmission, thus reducing the overall friction the user must overcome to move the lawnmower. However, in this construction, the output shafts of the transmission are independent from each other. This separation necessitates additional support for the shafts in the transmission housing. The shafts must be supported because of the joint they have between the left and right output shafts. It is also known to use a freewheeling ratchet system built into the wheel pinion mounted on the transmission output shaft. However, this design is susceptible to dust intrusion because of tight tolerances of the mating parts.

BRIEF DESCRIPTION

According to one aspect, a transmission for a manually operated wheeled machine having a drive condition and a freewheeling condition is provided. The transmission comprises an output shaft, a first gear rotatably mounted on an end portion of the output shaft, a shuttle movably axially on the end portion of the output shaft, and an engagement member mounted in a fixed manner on the end portion of the output for shaft for co-rotation with the output shaft. The first gear includes first dog teeth. The shuttle includes second dog teeth which are in selective engagement with the first dog teeth. The engagement member is engaged with the shuttle for transmitting torque from the output shaft to the first gear. The first gear is meshingly engaged with a second gear carried within a drive wheel. In the drive condition the output shaft rotates in a first rotational direction, the engagement member axially moves the shuttle into engagement with the first gear, first surfaces of the respective first and second dog teeth engage, and, as a result, the first gear rotates in the first direction together with the output shaft. In the freewheeling condition the output shaft is stationary, an overdrive of the first gear results in engagement of second surfaces of the respective first and second dog teeth, and, as a result, the shuttle axially moves out of engagement with the first gear allowing for free rotation of the first gear about the stationary output shaft.

According to another aspect, a manually operated wheeled machine comprises a motor, an output shaft operably coupled to the motor, a drive wheel connected to the output shaft, and a transmission housed within the drive wheel. The transmission includes a first gear rotatably mounted on the output shaft, an engagement member mounted in a fixed manner on the output shaft for co-rotation with the output shaft, a shuttle mounted for axial movement on the output shaft and interposed between the first gear and the engagement member, and a second gear carried within the drive wheel and meshingly engaged with the first gear. The first gear includes first dog teeth. The shuttle includes second dog teeth which are in selective engagement with the first dog teeth. Where in a drive condition of the wheeled machine the output shaft rotates in a first rotational direction, the engagement member is adapted to axially move the shuttle into engagement with the first gear, the second dog teeth coact with the first dog teeth in a first state, and the first gear is secured in rotation with the output shaft. Where in a freewheeling condition of the wheeled machine the output shaft is stationary, an overdrive of the first gear results in the first dog teeth coacting with the second dog teeth in a second state, the shuttle adapted to axially move out of engagement with the first gear allowing for free rotation of the first gear about the stationary output shaft.

According to another aspect, a drive wheel for a manually operated wheeled machine comprises an inside cover defining an enclosure. A transmission is received in the enclosure. The transmission includes a first gear rotatably mounted on an associated output shaft of the wheeled machine, an engagement member mounted in a fixed manner on the associated output shaft for co-rotation with the output shaft, and a shuttle mounted for axial movement on the associated output shaft and interposed between the first gear and the engagement member. The first gear includes first dog teeth. The engagement member has an axial nub configured to mate with the shuttle. The shuttle includes second dog teeth which are in selective engagement with the first dog teeth and a ramp in contact with the nub. A second gear is mounted coaxially with a rotational axis of the drive wheel and is meshingly engaged with the first gear.

DETAILED DESCRIPTION

Figure 1:
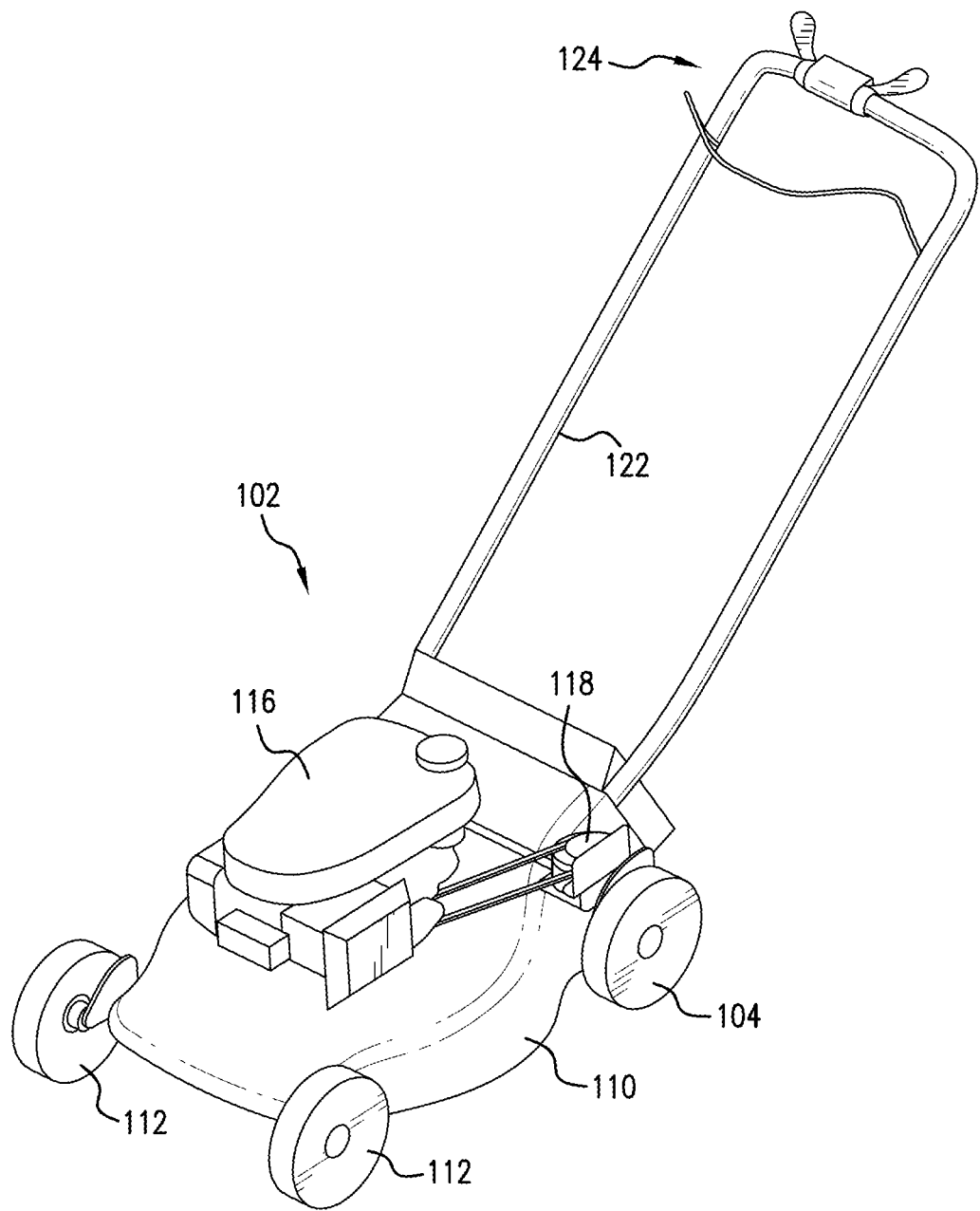
FIG. 1 is a schematic perspective view of a manually operated wheeled machine in the form of a walk-behind self-propelled lawn mower.

It should, of course, be understood that the description and drawings herein are merely illustrative and that various modifications and changes can be made in the structures disclosed without departing from the present disclosure. Referring now to the drawings, wherein like numerals refer to like parts throughout the several views, the present disclosure relates to a transmission 100 for a manually operated wheeled machine 102 having a drive condition and a freewheeling condition. As used herein, the drive condition refers to a condition of the wheeled machine where the transmission 100 is in an engaged state and torque is transmitted to at least one drive wheel 104 of the wheeled machine 102, and the freewheeling condition refers to a condition of the wheeled machine where the transmission 100 is in a disengaged state and the at least one drive wheel 104 can freely rotate in both forward and rearward directions. FIG. 1 shows the application of the transmission 100 to a self-propelled, walk-behind lawn mower (i.e., the wheeled machine 102) with which an operator mows, walking behind the lawn mower. However, it should be noted that the transmission 100 could be used with a wide variety of manually operated wheeled power implements, including various types of lawn mowers, power carriers (i.e., wheelbarrows), snow throwers, and the like; the lawn mower 102 merely exemplifies the present disclosure.

Figure 2:
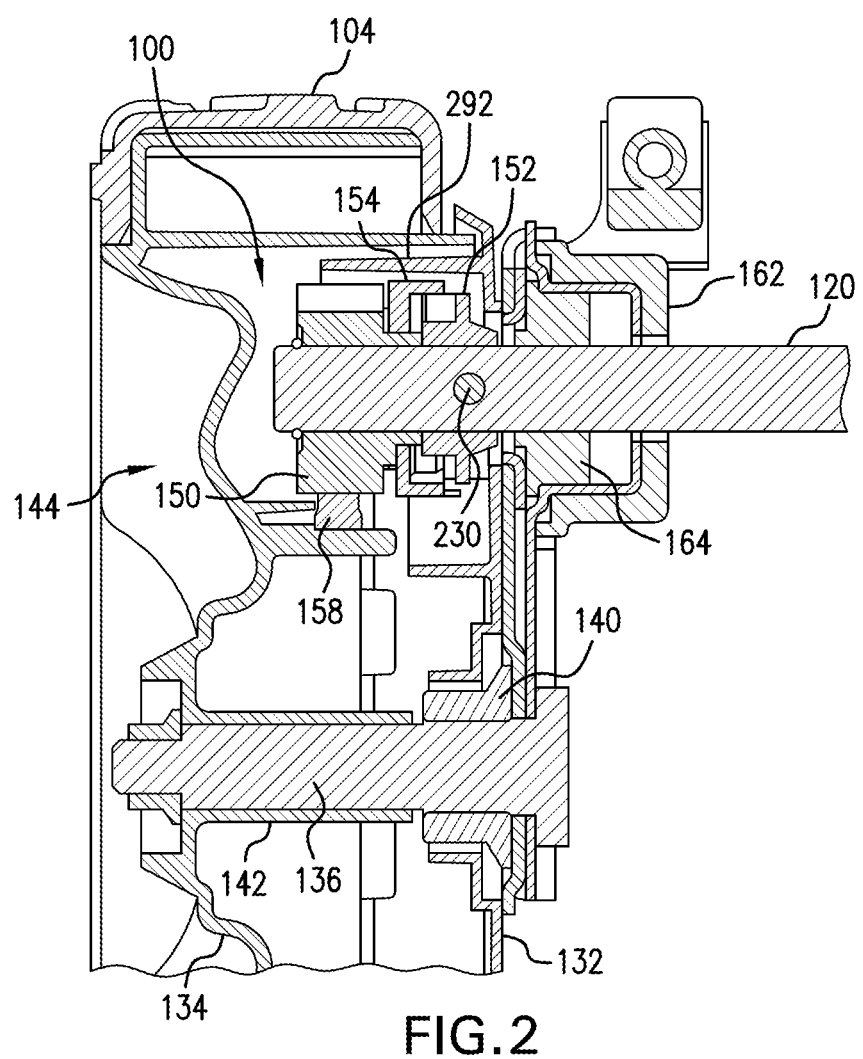
FIG. 2 is a partial cross-sectional view of a drive wheel of the lawn mower.

As schematically illustrated in FIG. 1, the lawn mower 102 has a blade housing 110 carried by rear drive wheels 104 (the right rear drive wheel is not shown because FIG. 1 is a view of the lawn mower 102 taken from one side) and front wheels 112. Mounted atop the housing 110 is a "prime mover" 116, which is a gasoline engine in the embodiment depicted in FIG. 1, but could alternatively be an electric motor. As is well known, a cutting blade (not shown) is connected to an output shaft (not shown) of the engine 116, a drive unit 118 is operably coupled to the output shaft, and the drive wheels 104 are operably connected to the drive unit 118 via an output shaft or drive shaft 120 of the drive unit 118 (FIG. 2). An operating handle 122 extends obliquely from the rear of the housing 110 in a rearward and upward direction and includes operator controls 124, which are configured to selectively engage and disengage the drive unit 118.

With reference to FIG. 2, the drive wheel 104 includes an inside cover 132 connected to a wheel portion 134. An axle 136 of the drive wheel 104 extends through the inner cover 132 and a mounting nut 140 is mounted thereto. The axle 136 is fitted in a hub 142 of the wheel portion 134. The inside cover 132 together with the wheel portion 134 define an enclosure 144, and the exemplary transmission 100 is received in the enclosure. According to the present disclosure, the transmission 100 includes a first gear or drive gear 150 rotatably mounted on an end portion of the drive shaft 120, an engagement member 152 mounted in a fixed manner on the end portion of the drive shaft 120 for co-rotation with the drive shaft 120, and a shuttle 154 mounted for axial movement on the end portion of the drive shaft 120. The shuttle 154 is interposed between the first gear 150 and the engagement member 152 (see FIG. 3). A second gear or driven gear 158 is fixedly mounted on the wheel portion 134 coaxially with a rotational axis of the drive wheel 104 and is meshingly engaged with the first gear 150 (see FIG. 4). Further depicted, a bearing housing 162 is mounted to the housing 110 and secures a bearing 164 for the drive shaft 120. A snap ring 166 fitted into a circumferential groove 168 on the drive shaft 120 secures the first gear 150 and the shuttle 154 to end portion of the drive shaft 120. The transmission 100 acts to transmit power from the drive shaft 120, through the second gear 158, to the drive wheel 104. The transmission 100 is configured to allow the drive wheel 104 to bidirectionally freewheel when the drive shaft 120 is stationary (i.e., the drive shaft is not rotated by the drive unit 118).

Figure 5:
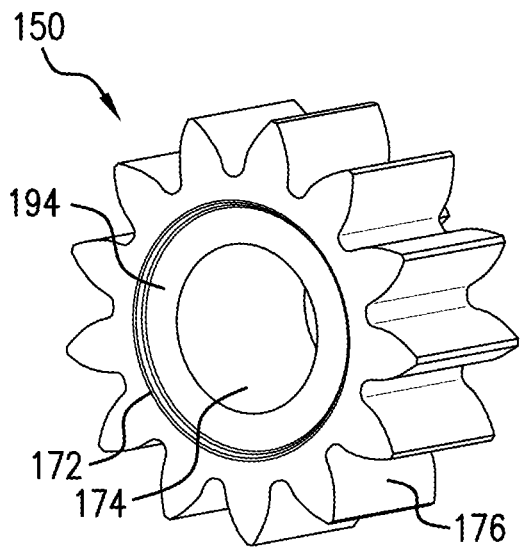
FIGS. 5 and 6 are perspective views of a drive gear of the transmission.
Figure 6:
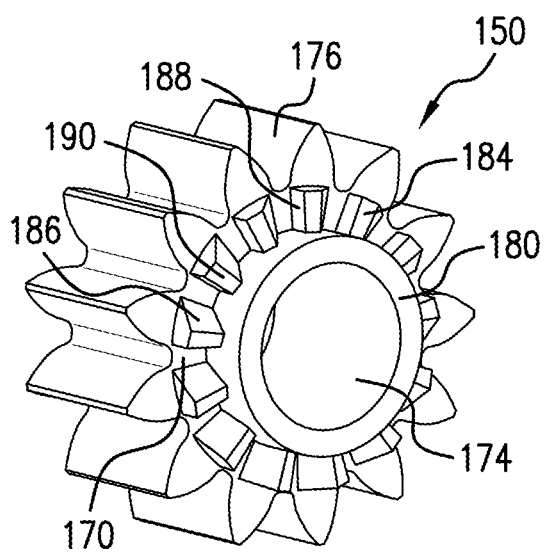

FIGS. 5 and 6 depict the exemplary first gear 150. The first gear 150 includes a first confronting surface 170, a second confronting surface 172, a through hole 174 extending between the first and second confronting surfaces 170, 172 sized to receive the end portion of the drive shaft 120, and teeth 176 formed on an outer circumferential surface of the first gear 150. A boss 180 extends axially from the first confronting surface 170. The first gear 150 further includes first dog teeth 184 circumferentially spaced at equal intervals and projecting axially on the first confronting surface 170. The first dog teeth 184 include first surfaces 186, second surfaces 188 and third surfaces 190. In the depicted aspect, and with additional reference to FIGS. 11 and 12, the first surfaces 186 are canted relative to a rotational axis of the drive shaft 120, the second surfaces 188 are substantially parallel to the axis of rotation, and an acute angle is defined by the first and second surfaces 186, 188. The third surfaces 190 extend between the first and second surfaces 186, 188 and are oriented in a confronting manner to the shuttle 154. As depicted, the third surfaces 190 are canted relative to the radial direction of the drive shaft 120 and an obtuse angle is defined by each of the first and second surfaces 186, 188 and the third surfaces 190. The second confronting surface 172 can include a recessed portion 194 sized to receive the snap ring 166.

Figure 8:
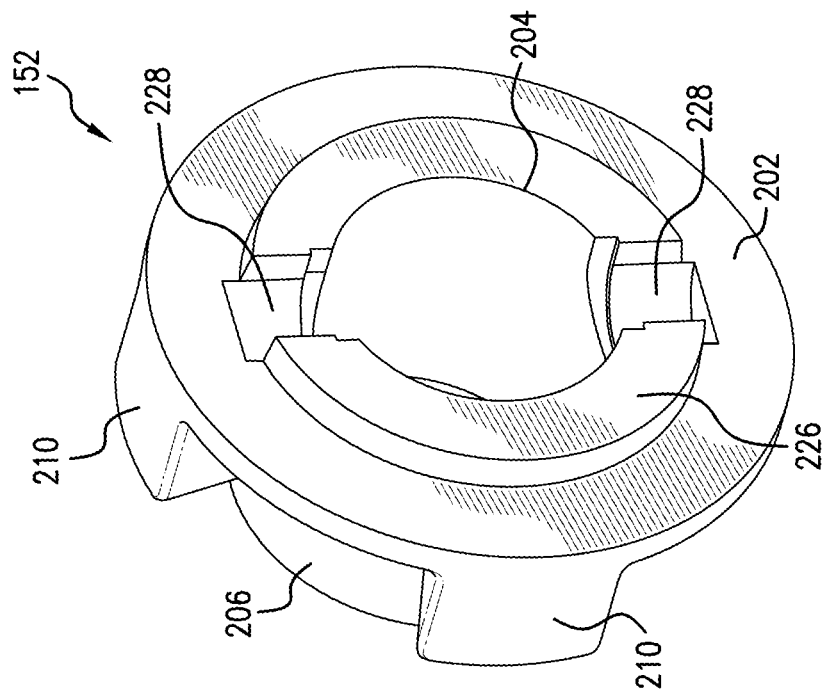
FIGS. 7 and 8 are perspective views of an engagement member of the transmission.
Figure 7:
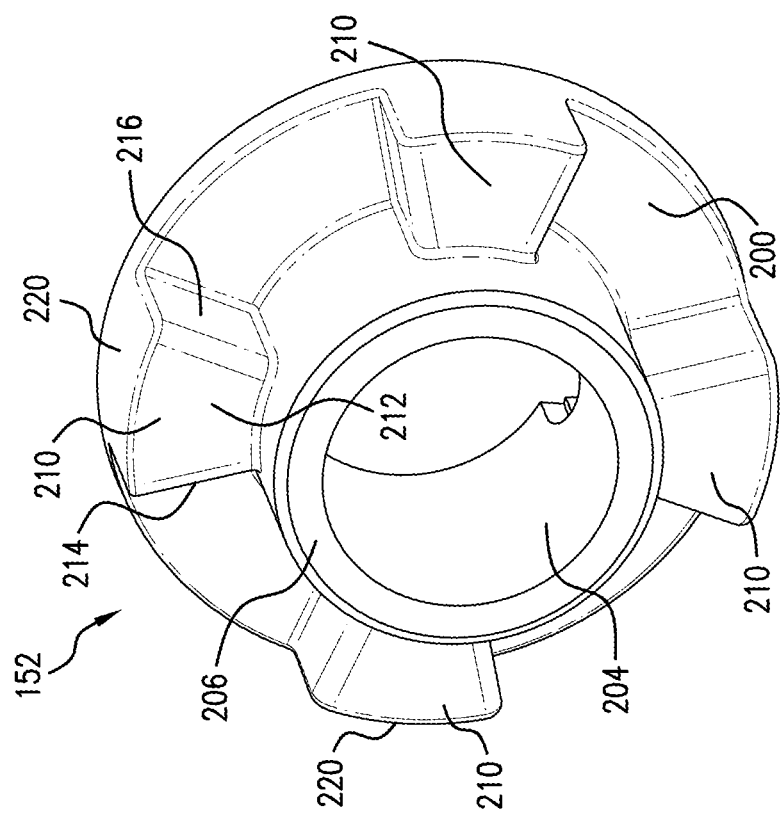

FIGS. 7 and 8 depict the exemplary engagement member 152. The engagement member 152 includes a first confronting surface 200, a second confronting surface 202, and a through hole 204 extending between the confronting surfaces for receiving the end portion of the drive shaft 120. A boss 206 extends axially from the first confronting surface 200. The engagement member 152 further includes at least one nub 210 projecting axially on the first confronting surface 200 and at least partially onto an outer surface of the boss 206. In the depicted embodiment, the engagement member 152 includes four nubs 210 circumferentially spaced at equal intervals on the first confronting surface 170; although, this is not required. According to one aspect, and when viewed facing the first confronting surface 200, each nub 210 can be trapezoidal shaped including a first surface 212 extending substantially parallel to the first confronting surface 200, side surfaces 214, 216 which are canted away from one another in the radial direction, and an outer circumferential surface 220. The second confronting surface 202 includes an axially extending boss 226 having diametrically spaced cutouts 228. The cutouts are sized to receive opposite end portions of a pin 230, which is located in bore 232 extending radially through the end portion of the drive shaft 120 (see FIG. 3). The pin 230 mounts the engagement member 152 in a fixed manner on the end portion of the drive shaft 120 for co-rotation therewith.

Figure 10:
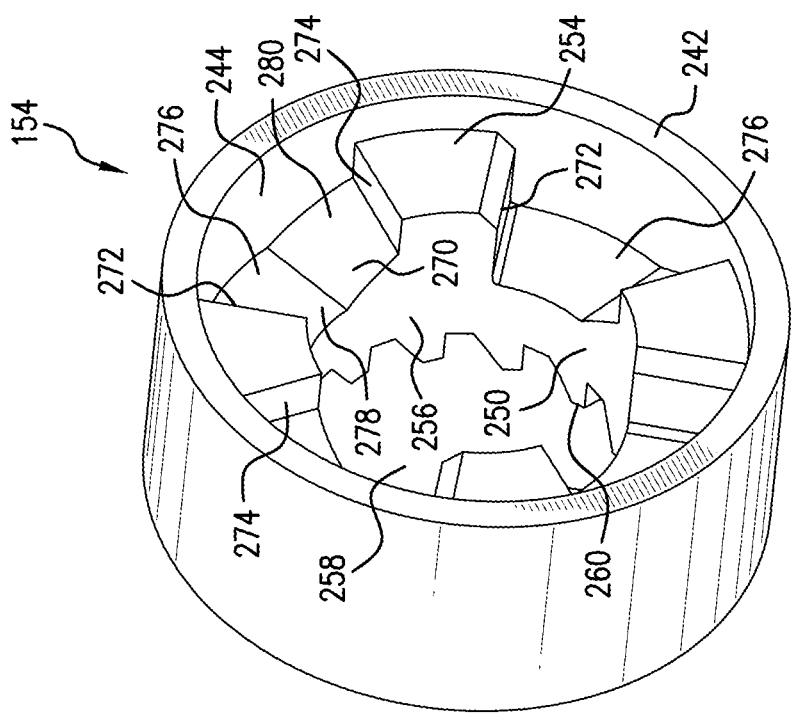
FIGS. 9 and 10 are perspective views of a shuttle of the transmission.
Figure 9:
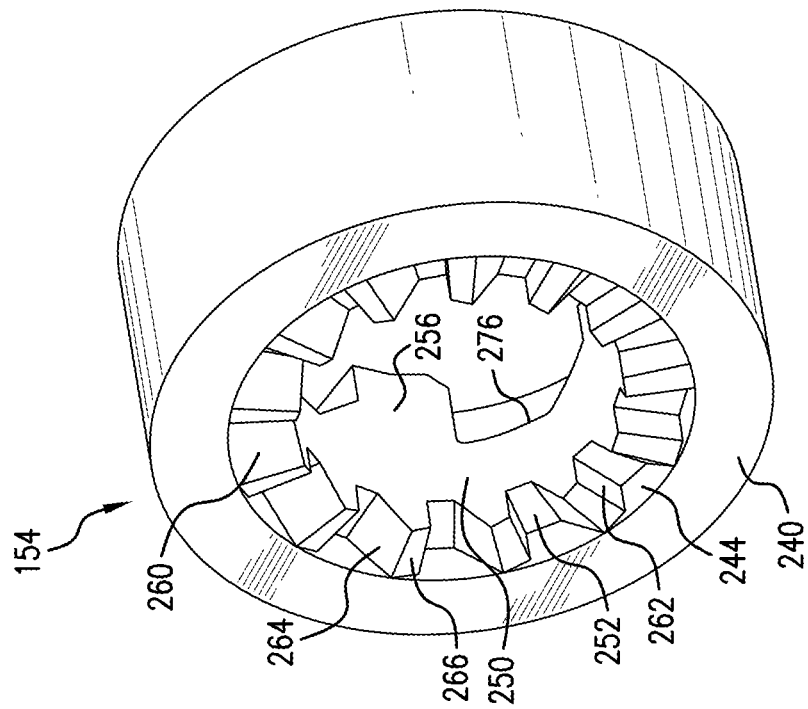

FIGS. 9 and 10 depict the exemplary shuttle 154. The shuttle 154, which can be ring-shaped, includes side surfaces 240, 242, and an inner surface 244. An engaging feature 250 for selective engagement with each of the first gear 150 and the engagement member 152 is provided circumferentially on the inner surface 244. The engaging feature 250 includes a first confronting surface 252, a second confronting surface 254, and an inner surface 256 defining a through hole 258. The through hole 258 is sized to at least partially receive therein the bosses 180, 206 of the respective first gear 150 and the engagement member 152. Second dog teeth 260 are circumferentially spaced at equal intervals and project axially on the first confronting surface 252. The second dog teeth include first surfaces 262, second surfaces 264 and third surfaces 266. In the depicted aspect, and with additional reference to FIGS. 11 and 12, the first surfaces 262 are canted relative to the rotational axis of the drive shaft 120 and the second surfaces 264 are substantially parallel to the axis of rotation. In the depicted aspect, the second confronting surface 254 of the shuttle 154 includes at least one cutout 270 for the at least one nub 210 of the engagement member 152. The cutout 270 is defined by a first axial surface 272, a second axial surface 274, and an inclined surface 276 extending between the first and second axial surfaces. The inclined surface 276 can include a first section 278 and a second section 280. The first section 278 forms a ramp in contact with the nub 210 and guides axial movement of the shuttle 154 on the drive shaft 120.

Figure 11:
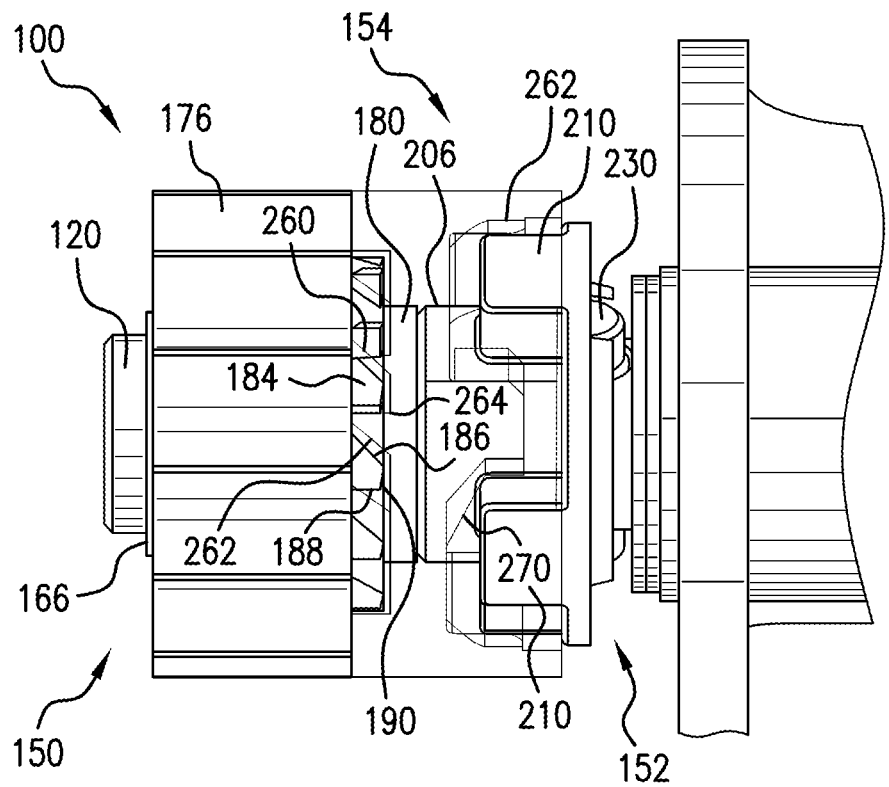
FIG. 11 is a perspective view of the transmission in a drive condition, with the shuttle transparent to show the interrelationship of the components of the transmission.
Figure 12:
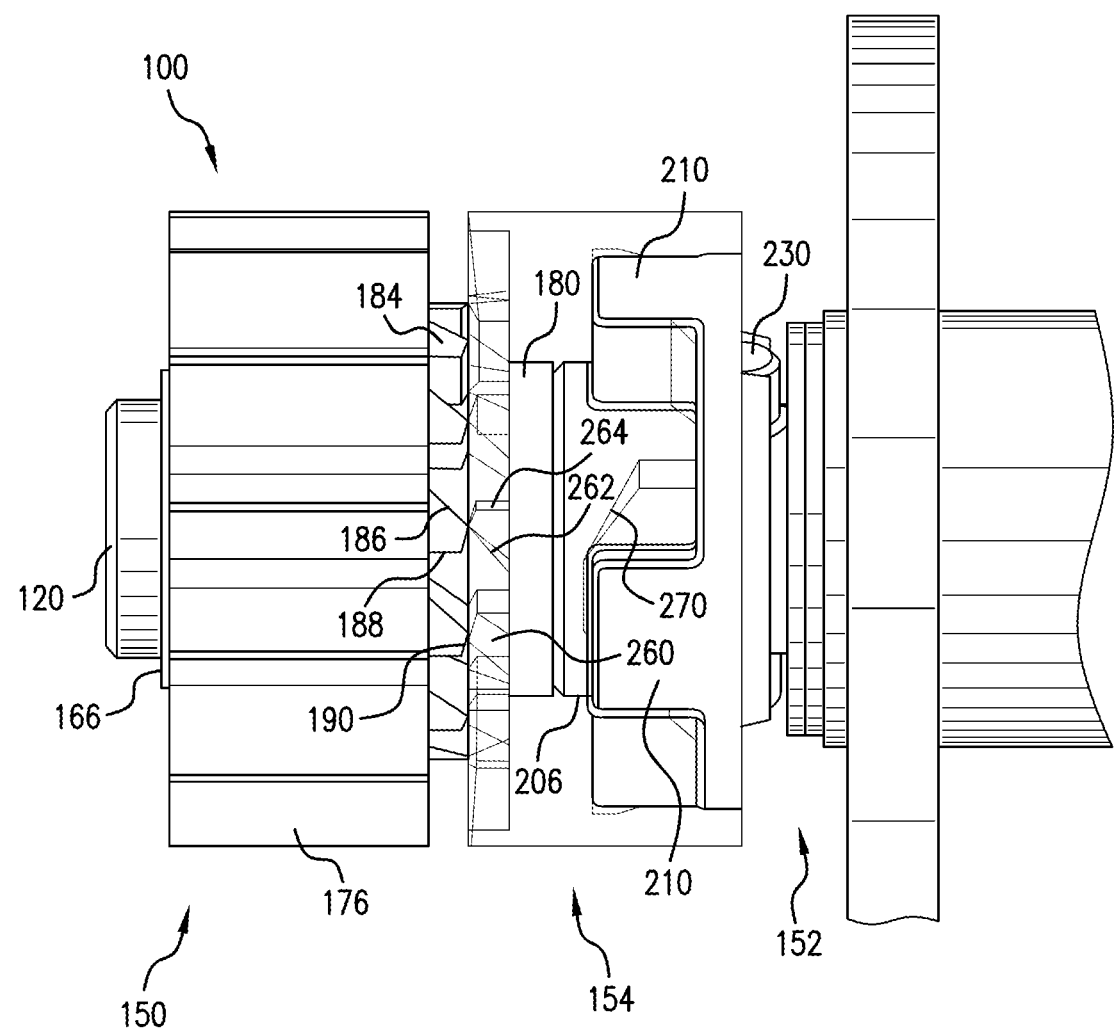
FIG. 12 is a perspective view of the transmission in a freewheeling condition, with the shuttle transparent to show the interrelationship of the components of the transmission.

FIGS. 11 and 12 depict the nubs 210 of the engagement member 152 in engagement with the shuttle 154. With reference to FIG. 11, in the drive condition of the wheeled machine 102 relative torque is transmitted from the output shaft of the engine 116 to the drive unit 118, which rotates the drive shaft 120 in a first rotational direction. This rotation of the drive shaft 120 causes the shuttle 154 to axially move into engagement with the first gear 150 via engagement with the engagement member 152. More particularly, with the engagement member 152 secured in rotation with the drive shaft 120, the rotational torque provides for guiding movement of the shuttle 154 toward the first gear 150 via contact of the nubs 210 with the inclined surfaces 276 of the shuttle engaging feature 250. The second dog teeth 260 of the shuttle 154 coact with the first dog teeth 184 of the first gear 150 in a first state, and the first gear 250 is secured in rotation with the drive shaft 120. FIG. 11 depicts the first state where the first surfaces 186, 262 of the respective first and second dog teeth 184, 260 are engaged, and the nubs 210 located in the cutouts 270 are in contact with the first axial surfaces 272. With reference to FIG. 12, in the freewheeling condition where the drive shaft 120 is stationary, an overdrive of the first gear 150 in the first rotational direction (which naturally takes place because of the inertia of the wheeled machine 102 which tends to give rise to supplemental advance of the wheeled machine) results in the second surfaces 188 of the first dog teeth 184 coacting with the second surfaces 264 of the second dog teeth 260 in a second state. As a result, the shuttle 154 axially moves out of engagement with the first gear 150 allowing for free rotation of the first gear 150 about the stationary drive shaft 120. FIG. 12 depicts the second state where the shuttle 154 is axially spaced from the first gear 150, and the nubs 210 located in the cutouts 270 are in contact with the second sections 280 of the inclined surfaces 276. Further, the third surfaces 190 at least partially confront the second dog teeth 260 and therefore are configured to prevent re-engagement of the shuttle 154 with the first gear 150 in the freewheeling condition. It should be appreciated that rotation again of the drive shaft 120 causes sliding movement of the inclined surfaces 276 of the shuttle 154 along the nubs 210 of the engagement member 252, thereby axially moving the shuttle 154 back into engagement with the first gear 150.

Figure 3:
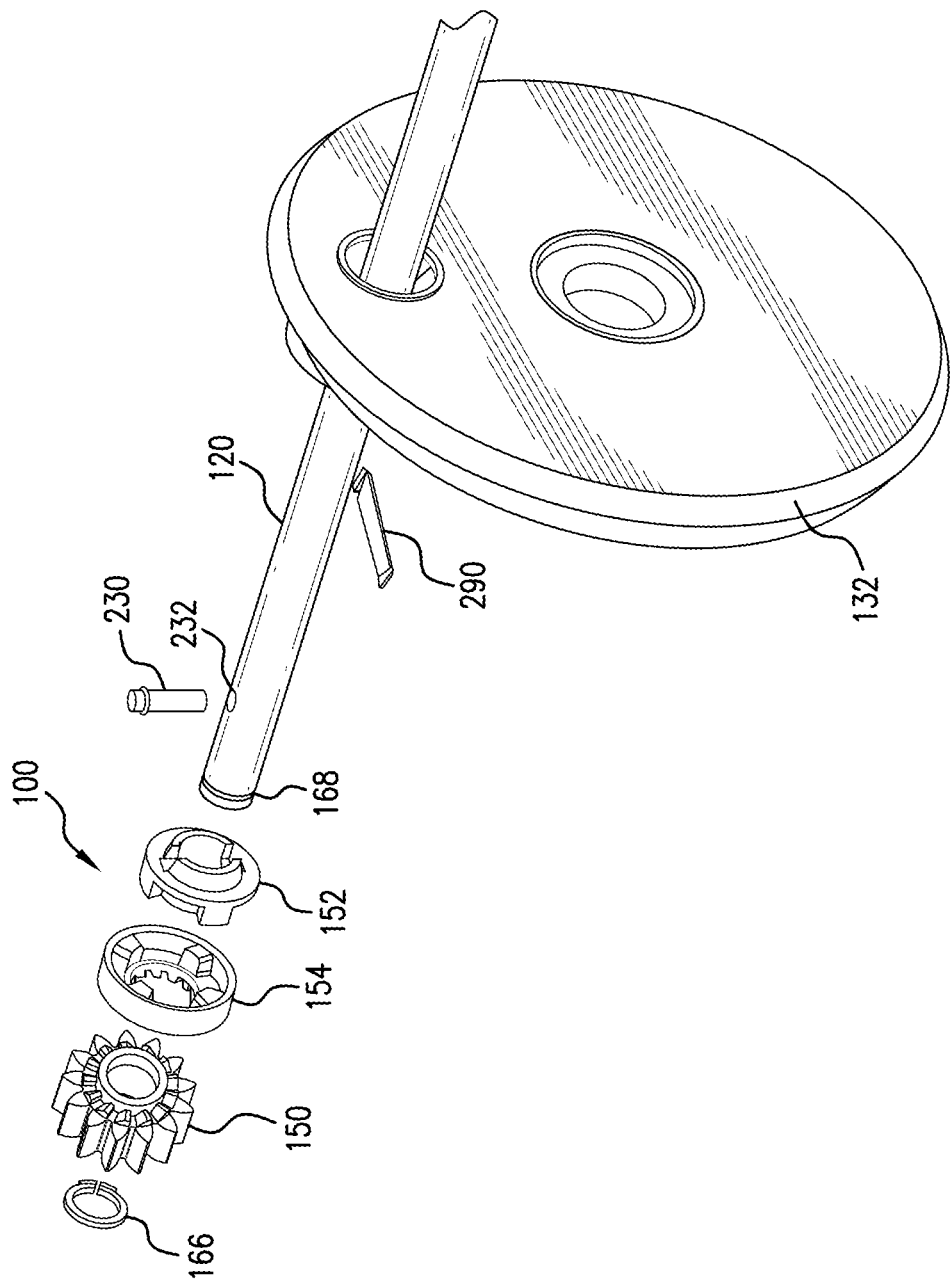
FIG. 3 is an exploded perspective view of an exemplary transmission housed in the drive wheel.
Figure 4:
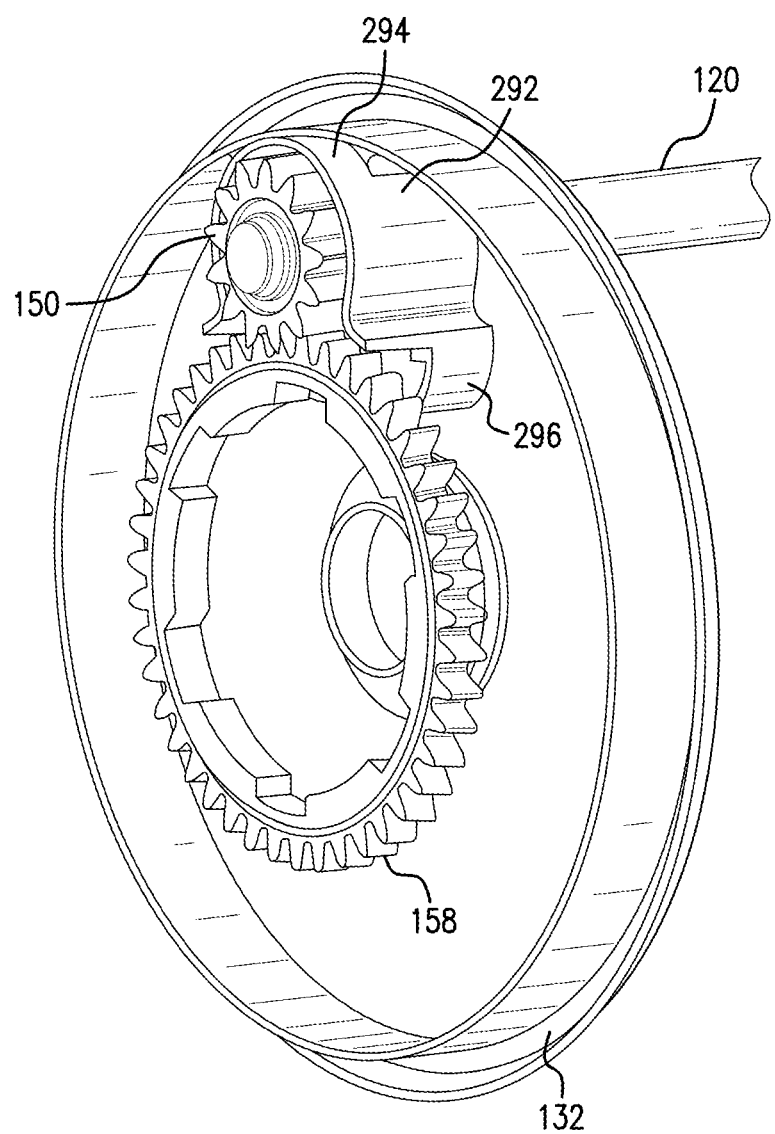
FIG. 4 is a perspective view of the transmission within the drive wheel.
Figure 13:
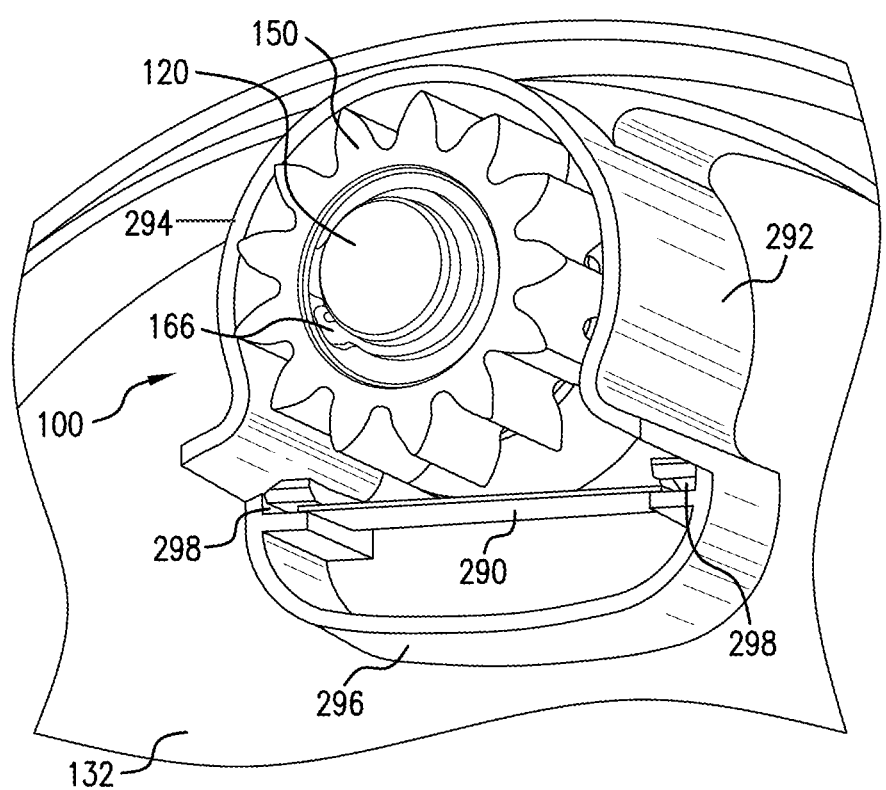
FIG. 13 is an enlarged partial view of FIG. 4.

As best depicted in FIGS. 2, 3 and 13, the transmission 100 further includes a friction member 290 adapted to engage the shuttle 154 in the freewheeling condition to prevent axial movement of the shuttle 154 toward the first gear 150. The friction member 290 can be constituted by a spring blade acting by friction on the shuttle 154. To accommodate the friction member 290, the inside wheel cover 132 for the drive wheel 104 includes a shroud 292 having an upper arcuate portion 294 covering each of the first gear 150, the shuttle 154 and the engagement member 152. It should be appreciated that the arcuate portion 294 also limits dust contamination of the transmission 100. A lower portion 296 of the shroud 292 includes channels 298. The channels 298 are adapted to receive the friction member 290, thereby securing the friction member 290 to the shroud 292.

Accordingly, the exemplary transmission 100 uses the axially movable shuttle 154 to selectively engage and disengage the first gear 150 from the drive shaft 120. When the drive wheel 104 rotates relative to the stationary drive shaft 120, the shuttle 154 is pushed by the first dog teeth 184 on the first gear 150 to disengage from the first gear. Once disengaged, the drive wheel 104 is free to rotate forward or reverse with minimum friction. The shuttle 154 remains disengaged until the drive shaft 120 again rotates. When the drive shaft 120 rotates, the shuttle 154 is axially moved onto the drive gear 150 by contact of the shuttle engaging feature 250 with the nubs 210 of the engagement member 152, which again is secured in rotation with the drive shaft 120. This movement of the shuttle 154 reengages the first and second dog teeth 184, 260, where the first gear 150 rotates together with the drive shaft 120. The axial movement of the shuttle 154 can be controlled relative to the first gear 150 and the engagement member 152 by the friction member 290 providing resistance against the shuttle 154 and allowing for relative movement between the first gear 150 and the engagement member 152 mounted to the drive shaft 120.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A transmission for a manually operated wheeled machine having a drive condition and a freewheeling condition, the transmission comprising:
    an output shaft;
    a first gear rotatably mounted on an end portion of the output shaft, the first gear including first dog teeth;
    a shuttle movably axially on the end portion of the output shaft, the shuttle including second dog teeth which are in selective engagement with the first dog teeth; and
    an engagement member mounted in a fixed manner on the end portion of the output shaft for co-rotation with the output shaft, the engagement member engaged with the shuttle for transmitting torque from the output shaft to the first gear,
    wherein the first gear is meshingly engaged with a second gear carried within a drive wheel,
    where in the drive condition the output shaft rotates in a first rotational direction, the engagement member axially moves the shuttle into engagement with the first gear, first surfaces of the respective first and second dog teeth engage, and, as a result, the first gear rotates in the first rotational direction together with the output shaft;
    where in the freewheeling condition the output shaft is stationary, an overdrive of the first gear results in engagement of second surfaces of the respective first and second dog teeth, and, as a result, the shuttle axially moves out of engagement with the first gear allowing for free rotation of the first gear about the stationary output shaft.

2. The transmission of claim 1, further including a friction member adapted to engage the shuttle in the freewheeling condition to prevent axial movement of the shuttle toward the first gear.

3. The transmission of claim 2, wherein each of the first gear, shuttle and engagement member is received in the drive wheel.

4. The transmission of claim 3, wherein an inside wheel cover for the drive wheel includes a shroud covering each of the first gear, shuttle and engagement member, and the friction member is secured to the shroud.

5. The transmission of claim 1, wherein the shuttle includes a first confronting surface having the second dog teeth and a second confronting surface is configured to provide for the axial movement of the shuttle relative to the engagement member.

6. The transmission of claim 5, wherein the engagement member includes a nub in engagement with the second confronting surface of the shuttle.

7. The transmission of claim 6, wherein the second confronting surface of the shuttle includes a cutout defined by a first axial surface, a second axial surface, and an inclined surface extending between the first and second axial surfaces, wherein the inclined surface forms a ramp in contact with the nub and guiding axial movement of the shuttle on the output shaft.

8. The transmission of claim 1, wherein the first surfaces of the respective first and second dog teeth are canted relative to a rotational axis of the output shaft.

9. The transmission of claim 8, wherein the second surfaces of the respective first and second dog teeth are substantially parallel to the axis of rotation.

10. The transmission of claim 1, wherein the first dog teeth include third surfaces configured to prevent re-engagement of the shuttle with the first gear in the freewheeling condition.

11. The transmission of claim 10, wherein the third surfaces are oriented substantially perpendicular to the first surface of the first dog teeth, and in the freewheeling condition the third surfaces confront the second dog teeth.

12. The transmission of claim 1, in combination with a manually operated lawnmower, the lawnmower including drive wheels, and the output shaft is one or more output shafts that extend to the drive wheels.

13. A manually operated wheeled machine comprising:
a motor;
an output shaft operably coupled to the motor;
a drive wheel connected to the output shaft; and
a transmission housed within the drive wheel, wherein the transmission includes:
a first gear rotatably mounted on the output shaft, the first gear including first dog teeth,
an engagement member mounted in a fixed manner on the output shaft for co-rotation with the output shaft,
a shuttle mounted for axial movement on the output shaft and interposed between the first gear and the engagement member, the shuttle including second dog teeth which are in selective engagement with the first dog teeth, and
a second gear carried within the drive wheel and meshingly engaged with the first gear,
where in a drive condition of the wheeled machine the output shaft rotates in a first rotational direction, the engagement member is adapted to axially move the shuttle into engagement with the first gear, the second dog teeth coact with the first dog teeth in a first state, and the first gear is secured in rotation with the output shaft;
where in a freewheeling condition of the wheeled machine the output shaft is stationary, an overdrive of the first gear results in the first dog teeth coacting with the second dog teeth in a second state, the shuttle adapted to axially move out of engagement with the first gear allowing for free rotation of the first gear about the stationary output shaft.

14. The wheeled machine of claim 13, wherein first surfaces of the respective first and second dog teeth are canted relative to a rotational axis of the output shaft, and second surfaces of the respective first and second dog teeth are substantially parallel to the axis of rotation,
where in the first state, the first surfaces of the respective first and second dog teeth are engaged, and in the second state, the second surfaces of the respective first and second dog teeth are engaged.

15. The wheeled machine of claim 14, wherein the first dog teeth include third surfaces configured to prevent re-engagement of the shuttle with the first gear in the freewheeling condition.

16. The wheeled machine of claim 13, wherein the engagement member includes an axially extending nub, and an inner surface of the shuttle includes a radially extending ramp, contact of the ramp with the nub guiding axial movement of the shuttle on the output shaft.

17. The wheeled machine of claim 13, wherein the transmission further includes a friction member adapted to engage the shuttle in the freewheeling condition to prevent axial movement of the shuttle toward the first gear.

18. A drive wheel for a manually operated wheeled machine comprising:
an inside cover defining an enclosure; and
a transmission received in the enclosure, the transmission including:
a first gear rotatably mounted on an associated output shaft of the wheeled machine, the first gear including first dog teeth,
an engagement member mounted in a fixed manner on the associated output shaft for co-rotation with the output shaft, the engagement member having an axial nub configured to mate with a shuttle,
the shuttle mounted for axial movement on the associated output shaft and interposed between the first gear and the engagement member, the shuttle including second dog teeth which are in selective engagement with the first dog teeth and a ramp in contact with the nub, and
a second gear mounted coaxially with a rotational axis of the drive wheel and meshingly engaged with the first gear.

19. The drive wheel of claim 18, wherein the inside cover includes a shroud covering each of the first gear, shuttle and engagement member.

20. The drive wheel of claim 19, wherein the transmission further includes a friction member secured to the shroud, the friction member adapted to engage the shuttle to prevent axial movement of the shuttle toward the first gear.

* * * * *